United States Patent [19]

Moravec

[11] Patent Number: 5,758,568
[45] Date of Patent: Jun. 2, 1998

[54] TOP SIDE COOKER HAVING COOKING HEAD WITH GEAR DRIVEN ADJUSTMENT FEET

[75] Inventor: Joseph V. Moravec, Downers Grove, Ill.

[73] Assignee: Keating of Chicago, Inc., Bellwood, Ill.

[21] Appl. No.: 872,848

[22] Filed: Jun. 11, 1997

[51] Int. Cl.⁶ .............................. A47J 37/00; A47J 37/06; B30B 1/08; B30B 15/22
[52] U.S. Cl. ..................... 99/349; 99/353; 99/379; 99/423
[58] Field of Search .................. 99/339, 340, 349, 99/357, 328–335, 375–379, 372, 353–355, 385–401, 425, 426, 430, 422–424, 447; 100/93 P, 233, 266, 324, 325; 126/394, 41 R, 41 A, 41 C, 39 H; 219/524, 442, 243, 450, 525; 426/233, 523

[56] References Cited

U.S. PATENT DOCUMENTS

| | | | |
|---|---|---|---|
| 3,638,554 | 2/1972 | Ackroyd | 426/523 X |
| 4,224,864 | 9/1980 | Wendell | 99/355 X |
| 4,690,044 | 9/1987 | Verkler | 99/419 |
| 4,697,504 | 10/1987 | Keating | 99/349 |
| 4,763,571 | 8/1988 | Bergling | 99/349 |
| 5,044,264 | 9/1991 | Forney | 99/423 X |
| 5,167,750 | 12/1992 | Myers | 100/93 P |
| 5,197,377 | 3/1993 | Jennings et al. | 99/379 X |
| 5,247,874 | 9/1993 | George, II et al. | 99/349 |
| 5,423,253 | 6/1995 | Olson et al. | 99/351 |
| 5,555,794 | 9/1996 | Templeton et al. | 99/349 |
| 5,619,910 | 4/1997 | Farnsworth et al. | 99/422 |
| 5,642,658 | 7/1997 | Liebermann | 99/379 X |

*Primary Examiner*—Timothy F. Simone
*Attorney, Agent, or Firm*—Nicholas A. Camasto

[57] ABSTRACT

A top side cooker has a pivotally mounted cooking head that is movable from an open position to a cooking position where its flat cooking surface is urged, by the weight of the cooking head, into engagement with the flat cooking surface of a grill. A simultaneously adjustable front foot and rear foot are coupled to the cooking head for establishing a distance between the cooking surface and the grill surface. A handle operates a worm gear arrangement coupled to a shaft, which extends from the front to the back of the cooking head. A front and a rear pinion gear engage front and rear racks that are coupled to the front foot and the rear foot, respectively. The handle rotates the shaft which simultaneously moves the front foot and the rear foot to adjust the distance between the cooking surface and the grill surface. The front foot includes indicia for indicating the distance.

8 Claims, 3 Drawing Sheets

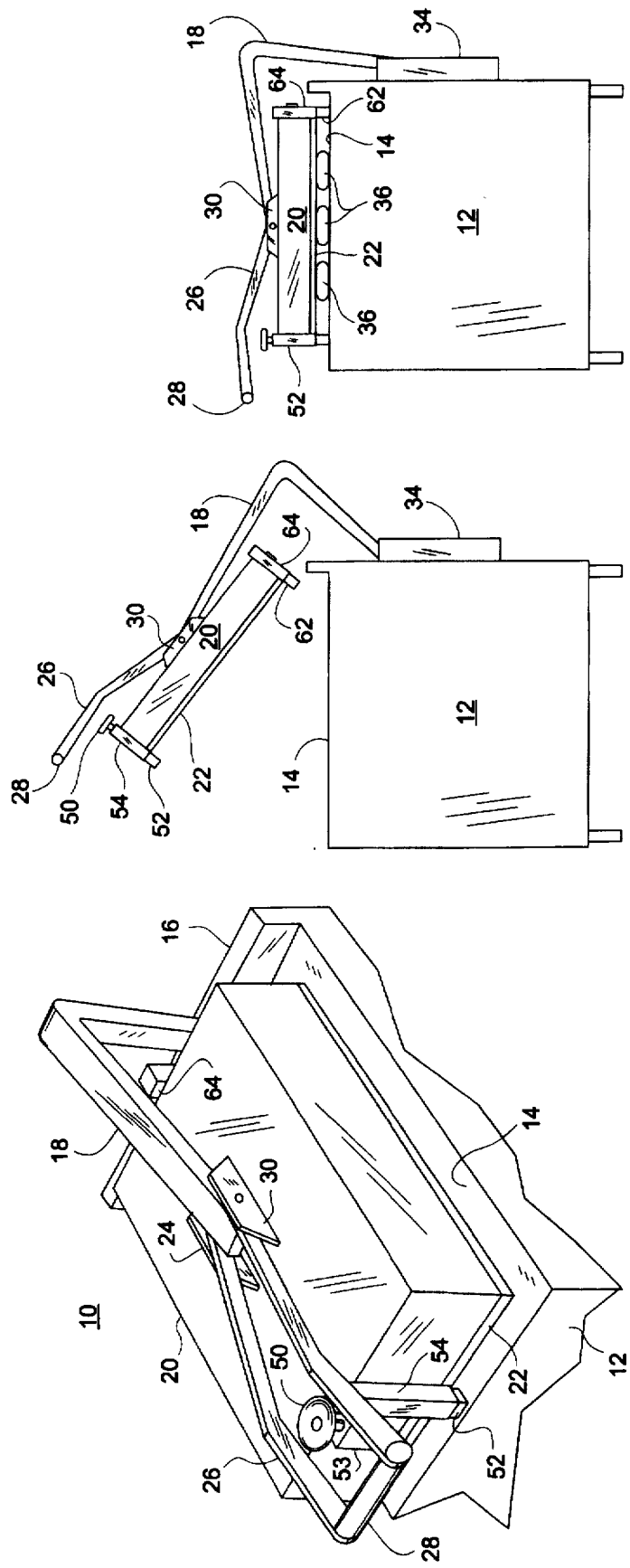

TOP SIDE COOKER HAVING COOKING HEAD WITH GEAR DRIVEN ADJUSTMENT FEET

BACKGROUND OF THE INVENTION AND PRIOR ART

This invention relates generally to so-called "clamshell" or top side cookers, that incorporate a pivotally mounted upper cooking head, and specifically to adjustment devices for maintaining a desired distance between the cooking head and a grill surface.

Top side cookers are popular since they materially reduce the cooking time for grilled foods. The combination of applied pressure and heating both the top and the bottom of the foodstuff during cooking enhances its texture, moisture content and appearance over conventional one-sided cooking of foodstuffs. One difficulty associated with top side cookers is that of avoiding excessive pressure on the foodstuff while assuring sufficient contact with the upper cooking surface to achieve the cooking benefits.

There are a number of prior art devices for physically supporting the cooking head a desired distance from the surface of the grill. Some use a four point adjustment, whereas others use a single or a dual point adjustment. Many of the devices are inconvenient to use and most are difficult to control and lack the degree of accuracy that may be desired and they do not achieve enough distance between the cooking head and the grill surface.

The present invention involves an adjustment mechanism that enables convenient and accurate simultaneous adjustment of front and rear adjustment feet that are coupled to the cooking head. It uses rack and pinion gears to accurately provide a dimension needed to accommodate thick foodstuffs (up to one and one-half inches) between the cooking head and the grill surface. A convenient handle and worm-and-worm-gear arrangement simultaneously drives the front and rear pinion gears, which move the racks that are integral with the adjustable front and rear feet. The rack length determines the maximum cooking head to grill surface distance, which is greater than that provided by the prior art devices.

OBJECTS OF THE INVENTION

A principal object of the invention is to provide a novel top side cooker.

A further object of the invention is to provide a top side cooker having an easily and accurately adjustable cooking head.

Another object of the invention is to provide a top side cooking head that can be precisely adjusted to be a desired distance from the surface of a grill.

A still further object of the invention is to provide a top side cooking head that can be precisely adjusted to a larger distance from the grill surface than any of the prior art devices.

BRIEF DESCRIPTION OF THE DRAWINGS

These and other objects and advantages of the invention will be apparent upon reading the following description in conjunction with the drawings, in which:

FIG. 1 is a partial perspective view of a top side cooker incorporating the invention;

FIG. 2 is a side view of the cooker of the invention with the cooking head in the open position;

FIG. 3 is a side view illustrating the cooking head in the cooking position;

DESCRIPTION OF THE PREFERRED EMBODIMENT

Figure 4:
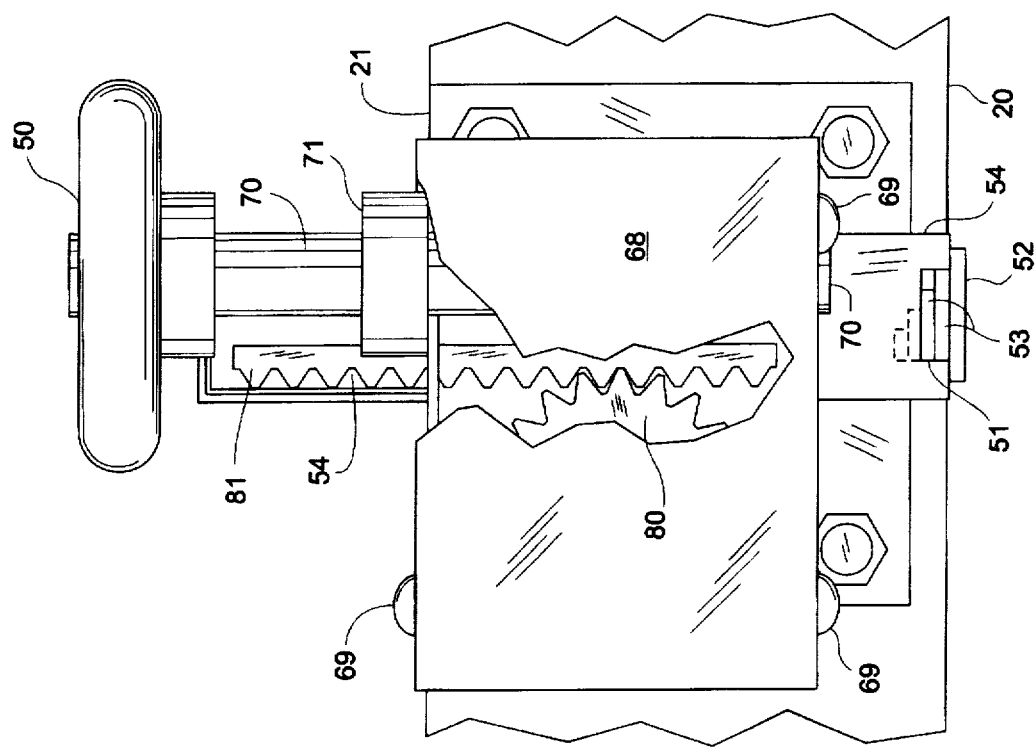
FIG. 4 is a partial front view of the adjustment mechanism of the invention.

Referring to FIGS. 1–3, a top side cooker 10 includes a grill 12 having a flat, heated grill surface 14 and a pivotally mounted upper cooking head 20. Grill 12 has a backsplash 16 at its rear and supports a movable L-shaped lift arm 18 that is pivotally connected to cooking head 20 by means of a pivot pin secured in a pair of brackets 24 and 30 that are affixed to the top of cooking head 20. A pair of arms 26 are attached to brackets 24 and 30 and extend into a handle 28 that is used for raising cooking head 20 to its open position (shown in FIG. 2) and for lowering it to its closed position for cooking (shown in FIG. 3). Cooking head 20 is generally rectangular in shape and has substantial weight. It has a very flat cooking surface 22 on its underside that assumes a parallel attitude with respect to grill surface 14 when the cooking head is in its closed position. Those skilled in the art will appreciate that cooking head 20 and grill 12 include means (omitted for simplicity) for heating both cooking surface 22 and grill surface 14. A spring mechanism 34 is arranged to exert a counterbalancing force on lifter arm 18 to offset the weight of cooking head 20.

An adjustment handle 50 is shown at the front of cooking head 20. The adjustment handle is rotatable to raise and lower both a front adjustment foot 52 and a rear adjustment foot 62 to establish a desired distance between the cooking surface 22 and grill surface 14, when in the closed position. As will be seen, the adjustment feet are controlled simultaneously by means of a gear drive arrangement 53 that longitudinally moves the feet within respective housings 54 and 64. A plurality of foodstuffs 36 (illustrated as hamburger patties), is shown sandwiched between cooking head 20 and grill surface 14 in FIG. 3. It should be apparent that when the cooking head 20 is brought into contact with the foodstuffs on grill surface 14, they are subjected to pressure due to the weight of the cooking head and support the cooking head. As the foodstuffs cook, they shrink somewhat and when they have cooked sufficiently, the front foot and rear foot support the cooking head at the desired (preset) distance. Ideally, the foodstuffs remain in contact with the cooking head surface 22 during the remainder of the timed cooking cycle. A non-stick coating or covering is often applied to cooking surface 22 of cooking head 20.

Figure 5:
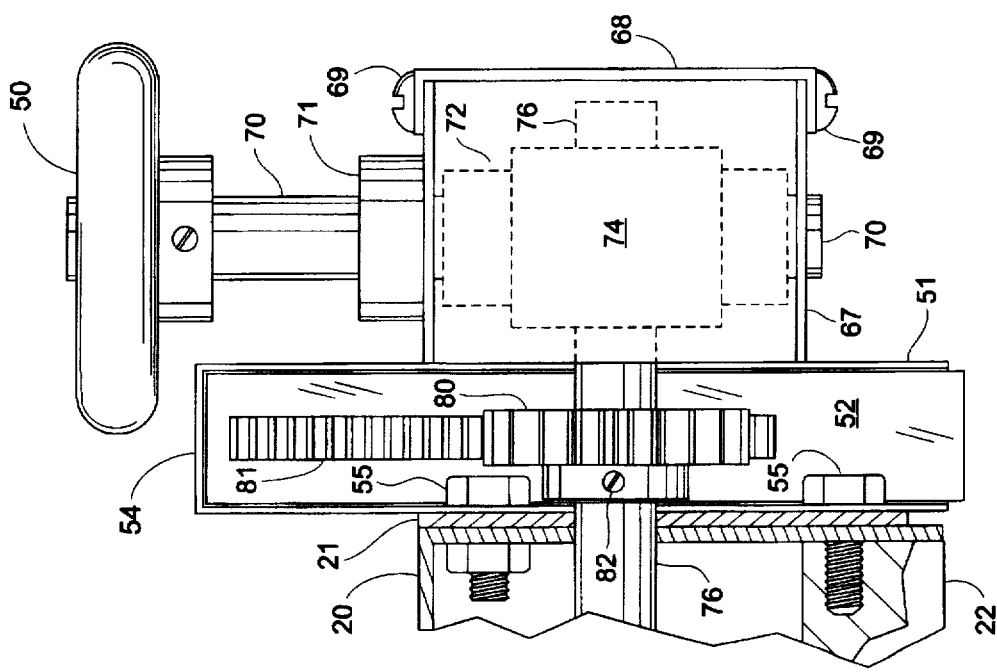
FIG. 5 is a partially cut away side view of FIG. 4.
Figure 7:
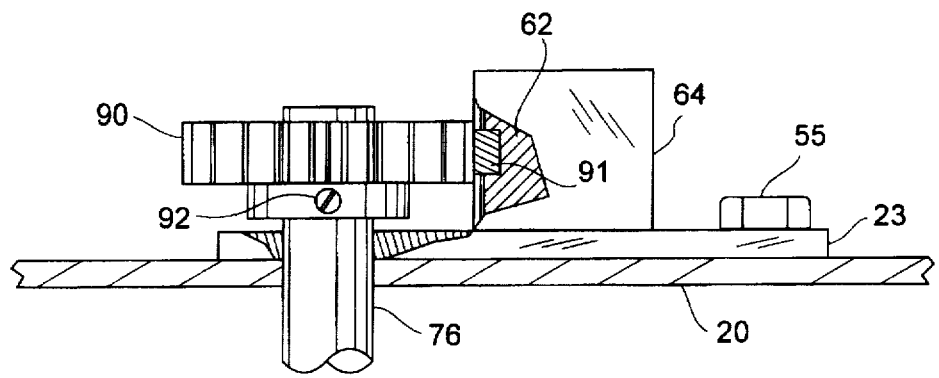
FIG. 7 is a top view of the adjustment mechanism at the rear of the cooking head.

FIGS. 4 and 5 indicate the gear drive arrangement of the invention. Handle 50 is secured to a shaft 70 that also has a collar 71 secured thereto. Collar 71 enables rotation of shaft 70 in a housing 67 which includes a cover 68 that is attached thereto by a plurality of screws 69. Within housing 67 is a worm 72 which engages a helix or worm gear 74 that is affixed to a shaft 76 extending from the front of cooking head 20 to the rear of the cooking head 20. Worm 72 and helix or worm gear 74 are not illustrated in detail as they are standard in the art. Portions of the structures in FIGS. 4 and 5 are broken away to expose a pinion gear 80 that is secured to shaft 76 by a set screw 82 (and a keyway in shaft 76) and which engages a rack 81. As seen in FIG. 7, a rear pinion gear 90 is secured to shaft 76 by a set screw 92 (and keyway)

and engages a corresponding rack 91. Rack 81 may be formed as part of solid rectangular foot 52 or secured thereto by any well known means. Similarly rack 91 may be part of foot 62. Pinion gears 80 and 90, being secured to shaft 76, rotate simultaneously therewith. Foot 52 is longitudinally movable within a housing 54 which includes a cutout 51 at its lower end for exposing indicia 53. The indicia yield a visible indication of the distance that foot 52 extends below cooking surface 22 of cooking head 20, which is the distance between cooking surface 22 and grill surface 14. While any type of indicia may be used, colored areas are preferred for communicating to the user the degree of cooking of the foodstuffs that will occur with the selected cooking time. It will also be appreciated that the fineness of the teeth in the racks and pinion gears (and to a lesser extent the worm-and-worm-gear) will determine the degree of accuracy and control that the user has over the positioning of the adjustment feet and consequently over the distance between the cooking surface of the cooking head and the surface of the grill. The front adjuster mechanism and the rear adjuster mechanism are secured to the front wall and rear wall, respectively, of cooking head 20 by any suitable means, heavy plates 21 and 23 and bolts 55 being shown.

During operation, the substantial weight of cooking head 20 is supported by the solid front foot 52 and solid rear foot 54, through pinion gears 80 and 90 and their corresponding racks 81 and 91, shaft 76 and heavy plates 21 and 23. Turning of handle 50 results in worm 72 rotating worm gear 74 and rotation of shaft 76. Since the pinion gears 80 and 90 are secured to their respective racks, 81 and 91, which are in turn secured to front foot 52 and rear foot 54, respectively, the adjustment feet move up or down together and correspondingly raise or lower cooking head 20.

Figure 6:
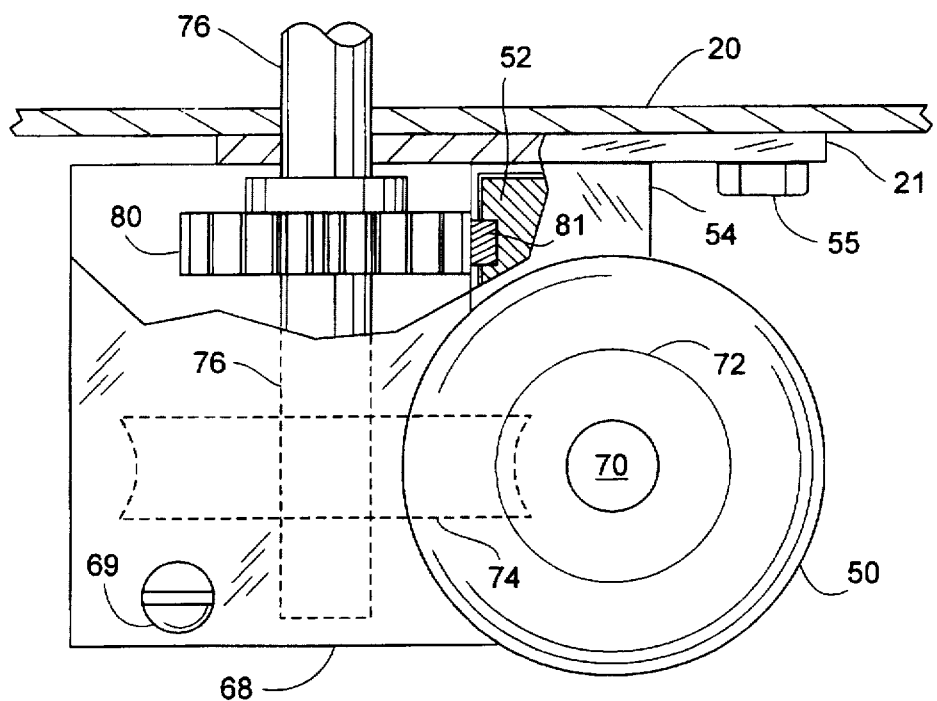
FIG. 6 is a top view of FIG. 4.

In FIGS. 6 and 7, top views of the front and rear adjustment arrangements are shown. In particular, the racks 81 and 91 are illustrated as separate pieces that are inset into a rectangular cutout in front foot 52 and rear foot 62, respectively. As indicated previously, the particular construction is a matter of design preference. Pinion gears 80 and 90 are shown engaging their respective racks 81 and 91 in the figures.

With the arrangement of the invention, both the front foot and the rear foot may be simultaneously raised or lowered by virtue of the rack and pinion gears that are coupled together via shaft 76 that traverses the cooking head. The degree of their adjustment may be readily and precisely controlled by rotation of handle 50 which rotationally drives shaft 76 through worm 72 and worm gear 74.

It is recognized that numerous modification and changes to the described embodiment of the invention will be apparent to those skilled in the art without departing from its true spirit and scope. The invention is to be limited only as defined in the claims.

What is claimed is:

1. A top side cooker comprising:

a flat grill surface;

a cooking head having a flat cooking surface;

means for loosely supporting said cooking head for pivotal movement between an open position, with said cooking surface suspended at an angle to said grill surface, and a closed position, with the weight of said cooking head urging said cooking surface into engagement with said grill surface, for cooking foodstuffs thereon;

a front foot and a rear foot, movably mounted to the front and to the rear of said cooking head, respectively, adapted to engage said grill surface to maintain a distance between said cooking surface and said grill surface; and gear means for simultaneously moving said front foot and said rear foot to adjust said distance.

2. The cooker of claim 1, wherein said cooker head is substantially rectangular shaped and wherein said gear means include:

front gear means engageable with said front foot;

rear gear means engageable with said rear foot; and a shaft interconnecting said front gear means and said rear gear means.

3. The cooker of claim 2, wherein said front gear means and said rear gear means each comprise a rack, coupled to said cooker head, and an associated pinion gear; and means for securing said pinion gears to said shaft.

4. The cooker of claim 3, wherein said front gear means further comprises a worm and a worm gear for driving said shaft.

5. The cooker of claim 4, further including a handle coupled to said worm.

6. The cooker of claim 5, further including indicia means for indicating said distance.

7. A top side cooker comprising:

a flat grill surface;

a cooking head having a flat cooking surface;

means for loosely supporting said cooking head for pivotal movement between an open position with said cooking surface suspended at an angle to said grill surface and a closed position with the weight of said cooking head urging said cooking surface into engagement with said grill surface for cooking foodstuffs thereon;

a front foot and a rear foot, movably mounted to the front and to the rear of said cooking head, respectively, adapted to engage said grill surface to maintain a distance between said cooking surface and said grill surface;

a front rack coupled to said front foot and a rear rack coupled to said rear foot;

a front pinion gear and a rear pinion gear associated with said front rack and said rear rack, respectively;

a shaft interconnecting said front and said rear pinion gears;

a worm and a worm gear for driving said shaft coupled to the front of said cooker head; and a handle coupled to said worm for simultaneously moving said front foot and said rear foot to adjust said distance.

8. The cooker of claim 7, further including indicia means for indicating said distance.

* * * * *